United States Patent [19]

Brog

[11] 4,446,164

[45] May 1, 1984

[54] WHEY BASED IMITATION MILK COMPOSITIONS

[76] Inventor: Roy A. Brog, 1600 N. Main, Logan, Utah 84321

[21] Appl. No.: 491,555

[22] Filed: May 4, 1983

Related U.S. Application Data

[63] Continuation-in-part of Ser. No. 361,761, Mar. 25, 1982, Pat. No. 4,397,927, which is a continuation-in-part of Ser. No. 185,534, Sep. 9, 1980, Pat. No. 4,337,278.

[51] Int. Cl.³ .............................................. A23C 11/04
[52] U.S. Cl. .................................... 426/583; 426/585; 426/588
[58] Field of Search ............... 426/580, 583, 585, 588, 426/801

[56] References Cited

U.S. PATENT DOCUMENTS

| | | | |
|---|---|---|---|
| 4,088,791 | 5/1978 | Jones | 426/583 |
| 4,199,608 | 4/1980 | Gilmore et al. | 426/583 |
| 4,269,864 | 5/1981 | Chirafisi et al. | 426/583 |
| 4,279,939 | 7/1981 | Cho | 426/583 |
| 4,337,278 | 6/1982 | Brog | 426/583 |
| 4,347,258 | 8/1982 | Merkenich et al. | 426/583 |
| 4,418,091 | 11/1983 | Glas | 426/588 |

Primary Examiner—Jeanette M. Hunter

[57] ABSTRACT

New imitation milk compositions which can be easily dispersed in water to form milk-like beverages having improved properties, such as improved flavor, texture and balance, are prepared by mixing a major portion of a sweet whey base with lesser amounts of a soluble protein, an edible vegetable oil, an added sugar or synthetic sweetner, and a minor amount of other nonfat dry milk solids, the weight ratio of water soluble protein to protein in the whey and the weight ratio of sugar to the lactose in the whey varying within certain specific limits. The nonfat dry milk solids must also be maintained within certain limits. Liquid dispersions, as imitating low-fat skim and whole milk beverages, obtained by dispersing the new compositions in water are also provided.

20 Claims, No Drawings

WHEY BASED IMITATION MILK COMPOSITIONS

BACKGROUND OF THE INVENTION

This application is a continuation-in-part of my copending pat. application Ser. No. 361,761, filed Mar. 25, 1982 now U.S. Pat. No. 4,397,927 which application was a continuation-in-part of Ser. No. 185,534 filed Sept. 9, 1980, and now issued as U.S. Pat. No. 4,337,278.

1. Field of the Invention

This invention relates to new and improved imitation milk compositions and dispersions prepared therefrom. More particularly, the invention relates to new imitation milk compositions having a whey base which can be easily dispersed in water to form milk-like beverages which simulate the flavor and texture of cow's milk.

Specifically, the invention provides new imitation milk compositions having improved properties over the imitation milk compositions disclosed and claimed in U.S. Pat. No. 4,337,278, particularly in the ability to form milk-like beverages having improved flavor, texture and balance. The new compositions of the present invention have a solids content comprising a sweet whey base combined with an added soluble protein, an edible vegetable oil, an added sugar or synthetic sweetener, and nonfat dry milk solids, the weight ratio of added water soluble protein to protein in the whey varying from about 0.2:1 to 1.5:1, and the weight ratio of added sugar to the lactose in the whey and added milk solids not fat varying from about 0.2:1 to 1.5:1. The dry milk solids not fat comprise about 3 to 42 percent by weight of the total composition. Other additives, such as stabilizers, emulsifiers, gums, flavors, vitamins, etc., as desired, may be added to the new compositions. Certain beneficial enzymes and bacteria may also be added.

The invention further provides liquid dispersions, such as low-fat skim and whole imitation milk beverages, such as may be obtained by dispersing the aforementioned imitation milk compositions in water.

While the term "imitation milk" is used throughout the specification and claims to describe the products of the invention, the term "whey milk" would be more appropriate. According to *Webster's New Collegiate Dictionary*, the term "milk" is not limited solely to fluid secreted from the mammary glands of females, but also includes liquids resembling milk such as latex from a plant, juice of a coconut and the contents of an unripe kernel of grain. The term "imitation" is an arbitrary regulatory term imposed by governmental agencies to distinguish a manufactured food product from the "real" product it may be substituted for. The term "whey milk" is just as distinguishing as the "imitation" designation and is far more accurate.

2. Prior Art

Whey is broadly defined as the by-product obtained from the manufacture of cheese. Sweet whey is obtained from the manufacture of Swiss, Mozzarella, Monterey Jack, Cheddar, and similar types of cheese resulting from the action of rennin, pepsin or vegetable derived enzymes on casein. The principal components of whey are milk sugar (lactose) and soluble milk protein (lactalbumin and lactoglobulin). Milk salts which contain calcium, sodium, potassium and phosphate ions are also present, as are minor amounts of fat. Demineralized or partially demineralized wheys may also be used. The cheese, from which the whey is a by-product, consists almost entirely of precipitated milk fat and the casein portion of milk protein.

Of the milk proteins, casein is much more prevalent in milk than whey proteins, e.g., from three to five times as great. When fat and casein have been removed during the cheese making process, essentially all of the remaining milk ingredients remain in the whey. Liquid whey consists of only about 7 percent by weight solids with the remainder being water. The whey solids are extracted from this watery base and dried before being used in this invention.

Many authorities of nutrition have recognized the value of whey solids which consist of about 10 to 14 percent whey proteins, primarily lactalbumin, 70 to 75 percent lactose, 7 to 10 percent salts, 0 to 1 percent fat with some enzymes and vitamins, the remainder being moisture. Demineralized wheys contain less salts. Athletes and consumers of health foods use whey-based powders and products and claim they derive curative, nutritional and health protective benefits. However, products based on whey, and beverages in particular, are generally unpalatable to humans because of the taste imparted by the whey. As a result, this product is relatively inexpensive and is used primarily as an animal feed or dumped as a waste product creating a sewage disposal problem.

Some attempts have been made to provide a synthetic milk utilizing whey solids. U.S. Pat. No. 2,923,628, which issued Feb. 2, 1960, teaches a combination of whey solids with lecithin and safflower seed oil and other minor ingredients.

A more recent patent relating to a simulated milk product containing whey solids is U.S. Pat. No. 3,642,493, which issued Feb. 15, 1972. This patent claims a combination of whey along with isolated vegetable protein and vegetable oil wherein the proportions of vegetable protein, vegetable oil and whey are in the same range as the casein, butter fat and whey that are in whole milk. A special processing step is required to prepare the protein.

Whey solids have also been incorporated into such edible compositions as garnishes, toppings and dressings of the sour cream type as taught in U.S. Pat. No. 3,560,220, which issue Feb. 2, 1971. Acid whey solids, such as obtained from cottage cheese manufacture, are used with an animal or vegetable fat being the major ingredient.

U.S. Pat. No. 3,560,220 also mentions the use of water soluble casein, i.e., sodium caseinate. This product is manufactured from casein by treating it with sodium hydroxide. The sodium caseinate salt thus obtained is generally considered as a "non-dairy" product and contains from about 0.3 to 3.0 percent by weight sodium ions.

Sodium caseinate, vegetable oils and an added carbohydrate are the basic ingredients of "non-dairy" creamers such as taught in U.S. Pat. No. 4,046,926, which issued Sept. 6, 1977, but are not generally suitable for beverage purposes because of the high fat content used to provide the creamy texture.

Although sodium caseinate and whey have been used in food products, they have not, heretofore, been used together to provide a palatable simulated milk beverage. Each of these products is derived from milk, but is considered to be a milk by-product and is often classified as being "non-dairy". Their use together has only been considered suitable as a substitute for non-fat milk solids in chemically leavened baked goods, such as is taught in U.S. Pat. No. 3,943,264, which issued Mar. 9, 1976. Such a product is marketed by Kraft, Inc. of Memphis, Tennessee, as a non-fat milk "alternate" under the registered trademark "Cake Classic."

OBJECTS OF THE INVENTION

It is an object of the present invention to provide new imitation milk compositions which can be used to prepare palatable milk-like beverages simulating the flavor and texture of cow's milk. It is a further object to provide a new and improved imitation milk composition having a whey base which can be used to form valuable milk-like beverages. It is a further object to provide an imitation milk containing a protein content made up of natural dairy or dairy derived by-products consisting, in part, of a mixture of processed soluble casein salt and whey protein from sweet dairy whey in specified weight ratios combined with specified amounts of other natural dairy or dairy-derived proteins. It is a further object to provide an imitation milk having a whey base combined with non-dairy products and a specified amount
of milk solids not fat from stated sources which simulates the flavor and texture of milk and which may be utilized as a powder or as a reconstituted liquid. It is a further object to provide a new and improved imitation milk composition having improved properties over the imitation milk compositions disclosed and claimed in U.S. Pat. No. 4,337,278, particularly in its ability to form beverages having improved flavor, texture and balance. These and other objects will be apparent from the following detailed description thereof.

SUMMARY OF THE INVENTION

It has now been discovered that these and other objects can be accomplished by the new imitation milk compositions of the present invention having a solids content consisting of a sweet whey base to which has been added a balanced amount of a soluble protein, an edible vegetable oil, an added sugar or synthetic sweetener and milk solids not fat from specified sources, the weight ratio of water soluble protein to protein in the whey varying from about 0.2:1 to 1.5:1, and the weight ratio of the added sugar to the lactose in the whey and added milk solids not fat varying from about 0.2:1 to 1.5:1. A synthetic sweetener would have approximately the same sweetening power as the added sugar. By balanced amount is meant the amount of soluble protein, vegetable oil, sweetener and milk solids not fat which must
be added to the whey solids to provide a palatable product which contains all of the nutrients found in bovine milk, although in different ratios. The product may be used in either a dry or liquid state and has the appearance and texture of milk.

The balance between the whey proteins, i.e., lactalbumin and lactoglobulin, and added soluble proteins, i.e., sodium caseinate, egg albumin, meat protein, soy isolate and the like, plus the protein from the added milk solids not fat, has been found to be a primary factor in contributing to the palatability of the product as will be hereinafter detailed. The combination of the lactose from the whey plus the lactose from the added milk solids not fat, with other sugars or synthetic sweetener sources, is also of importance in balancing the flavor and taste of the product. The vegetable oil, which is free of cholesterol, adds to the texture and creaminess of the imitation milk and may be utilized in such proportions as to provide imitation skim, low-fat or whole milk. The addition of the specified milk solids not fat adds unexpected improvements in the texture, flavor and balance of the milk products.

The imitation milk products obtained by dispersing the new compositions in water not only simulate the color, flavor and consistency of milk, but are considerably less expense to produce.

DETAILED DESCRIPTION OF THE INVENTION

The new imitation milk compositions of the present invention are prepared by admixing the five basic components, i.e., (1) sweet whey solids, (2) soluble proteins, (3) a sugar or synthetic sweetener, (4) a vegetable oil, and (5) specified milk solids not fat to provide a simulated milk product containing carbohydrates, proteins, fats and minerals as nutrients.

One basic difference between the imitation milk product of the invention and bovine milk is that the ratios of carbohydrate and protein are somewhat altered, although the taste and texture are similar. The carbohydrate content is higher and the protein is lower for the imitation milk as compared to cow's milk. All product ingredients will be reported as a weight ratio or percent by weight based on a simulated imitation milk powder or solids. The powder can be diluted with water to provide a fluid imitation milk or can be used directly in any application as a substitute for powdered milk.

The protein content of the imitation milk is a mixture of proteins from various sources. They may be all dairy derived, and preferably are, but need not be the constant protein source in that contained in the whey.

The added protein is stated to be a "soluble" protein. By soluble is meant either water soluble or suspendible. Finely divided proteins in colloidal size which will remain suspended in solution when admixed with water are, for the purposes of this description, considered as soluble. The added proteins may be derived from any suitable source and include egg albumin, gelatin, meat protein, soy isolate, casein salts and any other similar animal or vegetable protein. Preferred sources are egg albumin, casein salts and soy isolate. Casein salts are particularly preferred.

The processing of milk to obtain casein and the subsequent treatment of casein to form a soluble caseinate salt are both well known procedures. Sodium and calcium caseinate are commercial products.

The obtaining of other sources of soluble proteins such as albumin, gelatin, meat proteins and soy isolate are also well known and these products are commercially available.

Also, the processing of whey to obtain dry whey solids is known and whey powder is commercially available. Typically, dried whey contains from about 10 to 15 percent by weight protein. This protein is primarily lactalbumin with some lactoglobulin also being present. Dried whey also contains 61 to 75 percent lactose, 7 to 14 percent ash and 1 to 8 percent moisture.

Sweet whey from the manufacture of any hard cheese by the action of rennin on casein may be used. It is preferred to use a whey resulting from the manufacture of white cheese such as Swiss, Mozzarella and Monterey Jack or a yellow cheese such a Cheddar.

The whey content of the imitation milk product may vary within rather wide limits with ranges from 10 to 65 percent by weight being operable within the scope of the invention. Preferably, the range will vary from about 40 to 60 percent.

By mixing an added soluble protein with the whey in a weight ratio such that the ratio of added protein to protein from the whey is from about 0.2:1 to 1.5:1 and combining the mixture with a specified amount of milk solids not fat from other sources, it has been found that the objectionable flavor associated with whey is effectively neutralized. Preferably, the ratio of added protein to whey protein will be from about 0.8:1 to 1.2:1. Preferably, the added protein used will combine with the protein in the whey to form a mixture having a protein efficiency ratio (PER) which is greater than that of cow's milk. As previously stated, caseinate salts are particularly preferred as the source of added soluble protein. Generally speaking, smaller amounts of added milk solids not fat need to be used to balance flavor as the ratio of caseinate to protein in the whey approaches 1:1. Just why the approximately equal ratios of caseinate salts with protein from the whey renders a whey based mixture palatable is not known. For example, in milk from which no protein has been removed, the ratio of casein to other milk proteins is about 4:1. In other words, about 80 percent by weight of milk protein is casein. As the caseinate salt/protein from the whey ratio varies away from unity in either direction, greater amounts of MSNF from other sources may be used to balance the flavor. This may also be true when the added soluble protein is not a caseinate salt.

The imitation milk powder will have a protein content of about 10 to 25 percent by weight. In order to impart such a percent by weight to the imitation milk, the soluble protein (preferably sodium caseinate) will be present in amounts ranging from about 2 to 15 percent and preferably between about 4 to 10 percent. The soluble added protein not only helps to neutralize the whey flavor, but also adds texture and color to the mixture. Moreover, the added protein, being water soluble, also provides stability to a fluid suspension of the imitation milk blend when admixed with water.

The protein content from the whey will provide between about 1 and 8.5 percent by weight of the imitation milk powder. After taking into consideration the percent content of each ingredient and ratio of added soluble protein to protein from the whey, the remaining protein content will be made up from other sources of milk solids not fat (MSNF).

A preferred source of MSNF is nonfat dry milk, also commonly referred to as powdered skim milk. The amount of these solids may vary over a considerable range, but will generally range from about 3 percent to about 42 percent by weight. Particularly preferred ranges vary from about 5 percent to about 35 percent by weight. A typical nonfat dry milk composition contains about 30 to 38 percent protein, 50 to 55 percent lactose, 0.5 to 1.5 percent fat, 3.4 percent moisture and 6 to 10 percent ash. A method for preparing the nonfat dry milk solids can be found in Hall, et al, "Drying of Milk and Milk Products," AVI Publishing Co., 1971.

Other sources of MSNF having protein and carbohydrate contents similar to nonfat dry milk are dry buttermilk and whey protein concentrate. Dry buttermilk may contain up to about five percent by weight fat which should be taken into account when considering the amount of vegetable fat to be used. Whey protein concentrates are available containing from 25 to 75 percent protein and have a maximum lactose content of 60 percent. A whey protein concentrate having protein, carbohydrate and fat concentrations similar to nonfat dry milk differs from the nonfat dry milk primarily in protein makeup, i.e., only whey protein instead of roughly four parts casein and one part whey protein, as found in nonfat dry milk. For that reason, it may be desirable to utilize maximum amounts of caseinate salt when using whey protein concentrate.

The balance between whey, added soluble protein and nonfat dry milk or other sources of milk solids not fat may depend upon many factors and may often be determined empirically within the above ranges.

Any off flavor from the whey remaining after admixing the aforementioned ratios and amounts of added soluble protein with whey solids and milk solids not fat from other sources can be essentially completely overcome by the addition of a sugar or carbohydrate source separate from the lactose contained in the whey. However, the usage of added purified or refined lactose is not to be precluded. Any of the conventional commercially available sugars such as sucrose, fructose, dextrose or glucose may be utilized. In theory, any of the mono- or disaccharides derived from the hexoses such as glucose, fructose, galactose, mannose, sucrose, maltose and lactose may be used.

It may be beneficial to use a combination of simple and more complex sugars instead of just mono- and disaccharides. More complex sugars or simple starches such as oligosaccharides and polysaccharides may be substituted for a portion of the simple sugars. Such complex sugars include tetrasaccharides and dextrins. The more complex sugars are metabolized more slowly than the simple sugars and thus provide for more balanced carbohydrate metabolism in the body of one consuming the product. A preferred sugar combination is corn syrup solids which, when combined with the lactose from the whey, provides a carbohydrate containing by weight about 3 percent monosaccharides (glucose), 64 percent disaccharides (lactose, maltose) and 32 percent oligosaccharides and polysaccharides (tetrasaccharides, dextrins, etc.). Thus, the term sugar, as used herein, is deemed to include complex as well as simple sugars. Combinations of various sugars, such as corn syrup solids and sucrose, may also be used. Synthetic non-nutritive or nutritive sweeteners such as saccharin, cyclamate salts or, preferably, aspartame, having the sweetening power equivalent to the amount of sugar which would normally be added may be used in the place of sugar.

While the amount of added sugar is somewhat limited by the requirements of the other ingredients, it has been found that the ratio of added sugar to the lactose from the whey and milk solids not fat should be at least 0.2:1 and may be considerably higher. Ratios as high as 1.5:1 may be utilized; however, the preferred ratio is from about 0.3:1 to 0.1:1. The overall sugar content, i.e., lactose plus added sugar, will generally vary from about 40 to 80 percent by weight of the total imitation milk composition with the added sugar comprising 5 to 40 percent.

While fat is listed as a fundamental ingredient in the imitation milk of this invention, its usage is not essential to the palatability of the product. An edible vegetable oil, which is free from cholesterol, is added to provide the imitation milk with a milk-like texture and color. The higher the vegetable fat content is, the whiter the product appears to be and the more creamy it becomes when diluted with water. It is generally desired to prepare an imitation fluid milk which is either "low-fat", e.g., 0.5 to 2 percent fat, or "skim", e.g., 0.5 or less fat. However, an imitation whole milk containing 2 to 5 percent or even more fat may also be prepared. The solids content of fluid imitation milk prepared from the powder of this invention will usually be less than found in a comparable milk and will generally vary from about 8 percent for an imitation skim milk to about 11 percent for an imitation whole milk. However, the solids content need not be limited to a range of 8 to 11 percent, but may vary according to the taste, texture and composition desired. Therefore, a solids content as low as 5 percent or as high as 15 percent would still be within the scope of this invention.

In order to add an adequate amount of fat to prepare a powder which can be diluted to a skim, low-fat or whole imitation milk, the fat content of the powder product may vary from about 5 to 35 percent by weight. Any edible vegetable oil may be incorporated into the imitation milk product. Oils which have been found to be particularly useful in providing proper color and texture to the imitation milk product are partially hydrogenated coconut and soy oils or mixtures of the two.

Many political divisions have laws relating to the addition of vegetable oils to milk, cream or skimmed milk to prepare a product which may be passed off as a milk product. These "filled milk" statutes are primarily designed to assist the dairy farmer and allegedly serve to prevent the consumer from being deceived as to what he or she is buying. With current labeling laws requiring identification of all compounds in a packaged food coupled with consumer sophistication, most, if not all, of these filled milk laws have been repealed or declared unconstitutional by the courts.

One of the advantages of the present invention is that it benefits both the dairy farmer and the consumer. Whey solids are plentiful and the cheese maker has a need for a market for the whey. The more whey the cheese maker may dispose of, the more cheese he may make and the more milk the dairy farmer can produce. Moreover, sodium caseinate is also a milk by-product and its usage creates an increased market for the dairy farmer. On the other hand, whey is relatively inexpensive and the imitation milk of this invention is generally less costly than milk.

The whey solids and the nonfat dry milk solids contribute almost all of the inorganic matter found in the final product. Calcium is the predominant mineral; however, potassium, sodium and magnesium are also found to be present in varying degrees. Trace amounts of iron and copper may also be present. Phosphorous and chlorine are also present as inorganic constituents. Overall, the inorganic (ash) content of the imitation milk product will generally vary somewhere between about 2 percent to about 10 percent of the total solids.

Other ingredients which generally will comprise not more than 2 percent, and preferably between about 0.5 and 2.0 percent by weight of the imitation milk product may also be compounded with the above ingredients. Stabilizers, emulsifying agents, thickening agents, wetting agents and the like may be added to promote the dispersibility and suspendability of the various components. Typical of such ingredients are dipotassium and calcium phosphate, carrageenan, lecithin, guar gum, xanthan gum, cellulose ethers, gelatin and the like. Calcium, lactate or sulfate may be added as calcium builders. Vitamin A and D, which are generally added to fortify milk, may also be added, as may any other stable vitamins. Flavoring agents may be utilized as desired. For example, it may be desirable to add chocolate or a fruit flavor along with added sugar to provide an imitation chocolate milk or fruit flavored milk drink. Beneficial enzymes and bacteria may also be added if desired.

The product may also contain buffers to maintain the pH of the product within the optimum range of 6.7 to 7.1. However, the pH may vary from about 6 to 7.5 without any appreciable loss in flavor. Fruit flavored drinks may have a lower pH due to the acidity of some fruit extracts. Appropriate pH's may be obtained by the addition of minor amounts of a hydroxide or carbonate as the product will generally be adjusted from a more acid pH to a more basic one.

The product is preferably prepared in a two-step process. First, the soluble protein, fat, sugar and nonfat dry milk solids and other additives are dry blended together and thoroughly mixed. The mixed ingredients are then dry blended with the whey solids.

The blended powders may be treated by agglomeration to increase their wettability and dispersability, thereby producing an "instant" dry milk.

In the alternative, an aqueous solution of the blended ingredients may be spray-dried to provide a powdered product which will be readily reconstituted to form a fluid imitation milk.

The product may also be made and distributed in fluid form. As a fluid, it may be subjected to homogenization and pasteurization in the same manner as fluid milk. In some instances, it may be advantageous to homogenize and pasteurize a fluid product followed by spray or flash drying to obtain a powdered product.

The imitation milk has excellent storage capabilities in powdered form and has a shelf life as a liquid product equal to or exceeding its fluid milk counterpart.

The products of the present invention have numerous medical advantages over bovine milk in certain applications. University research has shown that whole cow's milk contains eleven different antigens which may cause milk allergies when consumed. When a product of the present invention, as shown in Example I, was reacted with the same sera, it was found to contain only five antigens. Whole cow's milk also contains a substance referred to as xanthine oxidase, which has been found to contribute to cardiovascular diseases. A university research study showed that the xanthine oxidase content of a product, as shown in Example I, was from 21 to 30 times lower than whole milk.

To illustrate the new products of the invention, the following examples are given. It is to be understood, however, that the examples are given in the way of illustration and not to be regarded as limiting the invention in any way.

EXAMPLE I

This example illustrates the preparation of a low-fat imitation milk composition.

A dry blend was made by combining 6.0 parts by weight of sodium caseinate with 25.2 parts by weight of corn syrup solids and 9 parts by weight of nonfat dry milk solids. To this mixture was added 15.8 parts by weight of a partially hydrogenated coconut oil and 1 part by weight stabilizer and flavoring. This product was thoroughly mixed in a ribbon blender. To the above product was blended 43 parts by weight whey solids containing 32.7 parts by weight lactose, 5.6 parts by weight protein and 4.7 parts by weight minerals and inorganics.

EXAMPLE II

This example illustrates the preparation of a milk-like beverage from the new imitation milk composition described in Example I.

The product of Example I was diluted with water by mixing 12 ounces of powder per gallon of water. The product was mixed in water at about 125° F., homogenized, pasteurized and then allowed to chill to about 40° F. The imitation milk beverage contained about 93 calories per 8 ounce cup and had 3.2 grams of protein, 13 grams carbohydrates and 3 grams fat per serving.

When compared to the low fat imitation milk beverage produced in Example II of U.S. Pat. No. 4,337,278, the imitation milk of this example possessed better flavor and balance.

EXAMPLE III

This example illustrates the preparation of an imitation skim milk composition according to the present invention.

A dry blend was prepared, as in Example I, with the following composition:

| Ingredient | Parts by Weight |
| --- | --- |
| Sodium Caseinate | 6.5 |
| Corn Syrup Solids | 27.1 |
| Partially Hydrogenated Coconut Oil | 4.4 |
| Additives | .8 |
| | 38.8 |

| Ingredient | Parts by Weight |
| --- | --- |
| Nonfat dry milk solids | 9.0 |
| (Lactose - 52.3%) | (4.7) |
| (Protein - 35.9%) | (3.2) |
| (Fats - .82%) | (.2) |
| (Minerals - 11.0%) | (.9) |
| | 9.0 |

| Ingredient | Parts by Weight |
| --- | --- |
| Whey Solids | 52.2 |
| (Lactose) | (39.7) |
| (Protein) | (7.0) |
| (Minerals) | (5.5) |
| | 52.2 |

This product was made into an imitation skim milk by mixing 10.5 ounces of powdered product per gallon of water as in Example II. The fluid product contained 3 grams of protein, 13 grams of carbohydrate and 1 gram of fat per 8 ounce serving and contained about 73 calories per serving.

EXAMPLE IV

This example illustrates the preparation of an imitation whole milk composition according to the present invention.

A dry blend was again prepared as in Example I having the following composition:

| Ingredient | Parts by Weight |
| --- | --- |
| Sodium Caseinate | 5.1 |
| Cane Sugar (sucrose) | 20.6 |
| Partially Hydrogenated Soya Oil | 27.4 |
| Additives | .9 |
| | 54.0 |

| Ingredient | Parts by Weight |
| --- | --- |
| Nonfat Dry Milk Solids | 9.0 |
| (Lactose - 52.0%) | (4.6) |
| (Protein - 38.2%) | (3.4) |
| (Fats - .8%) | (.2) |
| (Minerals - 9.0%) | (.8) |
| | 9.0 |

| Ingredients | Parts by Weight |
| --- | --- |
| Whey Solids | 37.0 |
| (Lactose) | (28.4) |
| (Protein) | (5.0) |
| (Minerals) | (3.6) |
| | 37.0 |

Following the procedure of Example II, 14.25 ounces of powdered product were mixed with a gallon of water. The imitation whole milk contained 3.4 grams of protein, 13.6 grams of carbohydrates and 7.0 grams of fat per 8 ounce serving and had a calorie content of about 131.

EXAMPLE V

This example illustrates the preparation of an imitation low-fat chocolate milk according to the present invention.

To 12 ounces of the dry product of Example I was blended 5.3 ounces of a commmercial sugar chocolate blend and 0.12 ounces of xanthane gum stabilizer in a ribbon blender. The blender product was diluted with water to one gallon and was found to have excellent taste and stability when being utilized as either a hot or cold beverage.

EXAMPLE VI

The low-fat imitation milk composition of Example I is reformulated using aspartame in the place of corn syrup solids. Aspartame is roughly 200 times sweeter than sucrose. Corn syrup solids, depending on type, have a sweetening value of between about 0.5 to 0.7 when compared to sucrose. Therefore, assuming an average sweetening value of 0.6 for corn syrup solids, the equivalent sweetening power of aspartame for corn syrup solids in Example I would be 0.6/200 or 0.003 parts of aspartame would be equivalent to one part corn syrup solids. Since 25.2 parts of corn syrup solids are replaced by aspartame, the composition would contain 0.0756 parts by weight aspartame.

EXAMPLE VII

The following compositions are illustrative of additional formulations which may be prepared within the scope of the invention:

| Ingredients | % Weight Total Solids | | | | | | | |
|---|---|---|---|---|---|---|---|---|
| | A | B | C | D | E | F | G | H |
| Whey | 25 | 60 | 15 | 50 | 35 | 45 | 30 | 40 |
| Vegetable Oil | 18 | 14 | 16 | 22 | 10 | 18 | 25 | 17 |
| Soluble Protein | 4.5 | 11 | 3 | 7 | 4 | 3 | 5 | 7.5 |
| MSNF | 25 | 5 | 35 | 10 | 18 | 14 | 10 | 15 |
| Sugar | 26 | 9.5 | 30 | 10 | 32 | 19 | 29 | 19 |
| Additives | 1.5 | 0.5 | 1.0 | 1.0 | 1.0 | 1.0 | 1.0 | 1.5 |

In any of the compositions listed, the vegetable oil could be partially hydrogenated coconut or soy oil or a mixture of the two. Other oils, such as safflower oil, peanut oil, and sunflower seed oil are also not to be precluded. The soluble protein is preferably sodium caseinate, but may also be calcium caseinate, egg albumin, gelatin, soy isolate or meat protein. The MSNF is preferably non-fat dry milk, but may also be a whey protein concentrate or dry buttermilk. The sugar may vary widely. Corn syrup solids and particularly a mixture of corn syrup solids is preferred. This may be mixed with or substituted with equivalent amounts of sucrose, fructose, glucose, maltose or synthetic sweeteners such a aspartame, as previously mentioned. The amounts of sugar or sweetening agent to be used may vary widely according to preferred taste and sweetening power. Glucose, corn syrup solids, maltose and lactose have less sweetening power than sucrose, while fructose is roughly 1.75 times sweeter than sucrose. Aspartame and other synthetic sweeteners are several hundred times sweeter than sucrose. Conventional additives, such as stabilizers, thickeners, emulsifiers and the like, are well known in the art as can be added as needed.

This example is but demonstrative of the multitude of products which may be empirically prepared having a whey base and containing appropriate proportions of added soluble proteins, MSNF, sugars and vegetable oils.

The above description and examples may be modified to produce a variety of imitation milk beverages which come within the scope of the invention. The invention is limited in scope only by the appended claims.

What is claimed is:

1. An imitation milk composition having a solids content consisting essentially of 10 to 65 percent by weight sweet whey solids, 2 to 20 percent by weight of a water soluble protein, 5 to 40 percent by weight of an added sugar, 5 to 35 percent by weight of an edible vegetable oil, and 3 to 42 percent by weight of other milk solids not fat, wherein the weight ratio of water soluble protein to the protein in the whey may vary from about 0.2:1 to 1.5:1, and wherein the weight ratio of added sugar to the lactose in the whey and added milk solids not fat may vary from about 0.2:1 to 1.5:1.

2. An imitation milk composition according to claim 1 wherein said other milk solids not fat are selected from the group consisting of nonfat dry milk, dry buttermilk and whey protein concentrate.

3. An imitation milk composition according to claim 2 wherein the soluble protein is selected from the group consisting of sodium caseinate, calcium caseinate, egg albumin, gelatin, soy isolate and meat protein.

4. An imitation milk composition according to claim 3 wherein the milk solids not fat is a nonfat dry milk.

5. An imitation milk composition according to claim 4 wherein the soluble protein is sodium caseinate.

6. An imitation milk composition according to claim 5 wherein the edible vegetable oil is a partially hydrogenated vegetable oil selected from the group consisting of coconut oil, soy oil and combinations thereof.

7. An imitation milk composition according to claim 5 wherein the added sugar consists, at least in part, of corn syrup solids.

8. An imitation milk composition according to claim 5 wherein the product additionally contains from about 0.5 to 2.0 percent by weight of additives selected from the group consisting of gums, emulsifiers, stabilizers, wetting agents, vitamins and flavorings.

9. An imitation milk composition according to claim 8 wherein the product is a powdered solid.

10. An imitation milk composition according to claim 9 wherein the product has been treated by agglomeration.

11. An imitation milk composition according to claim 8 in the form of a liquid beverage comprising a liquid aqueous dispersion consisting of 89 to 92 percent by weight water and 8 to 11 percent by weight of said solids.

12. An imitation milk beverage as defined in claim 11 which has been pasteurized and homogenized.

13. An imitation low-fat milk composition as defined in claim 4 comprising about 40 to 60 percent by weight whey solids, 4 to 10 percent by weight soluble protein, 10 to 40 percent by weight corn syrup solids, 5 to 35 percent by weight vegetable oil, 3 to 35 percent by weight nonfat dry milk solids and 0.5 to 2.0 percent by weight additives.

14. An imitation skim milk composition as defined in claim 13 wherein the ratio of soluble protein to protein from the whey may vary from about 0.8:1 to 1.2:1, and wherein the weight ratio of added sugar to the lactose in the whey and nonfat dry milk may vary from about 0.3:1 to 1:1.

15. An imitation liquid skim milk composition as defined in claim 11 wherein the fat content does not exceed 0.5 percent by weight of the total composition.

16. An imitation liquid low-fat milk composition as defined in claim 11 wherein the fat content is between 0.5 and 2.0 percent by weight of the total composition.

17. An imitation liquid whole milk composition as defined in claim 11 wherein the fat content is between 2.0 and 5.0 percent by weight of the total composition.

18. An imitation milk composition according to claim 1 wherein the added sugar has been replaced by an equivalent amount of a synthetic sweetening agent.

19. An imitation milk composition according to claim 18 wherein the synthetic sweetening agent is selected from the group consisting of saccharin salts, cyclamate salts and aspartame.

20. An imitation milk composition according to claim 19 wherein the synthetic sweetening agent is aspartame.

* * * * *